United States Patent [19]

Oldridge

[11] Patent Number: 5,101,618
[45] Date of Patent: Apr. 7, 1992

[54] VINE COMBER PIVOTING COUNTERFORCE BRUSH

[76] Inventor: Tommy L. Oldridge, 1118 Concord St., Lowell, Ark. 72745

[21] Appl. No.: 673,143
[22] Filed: Mar. 4, 1991
[51] Int. Cl.⁵ .............................................. A01D 46/28
[52] U.S. Cl. ...................................... 56/330; 56/15.5; 56/DIG. 2; 56/DIG. 19
[58] Field of Search ...................... 56/330, 328.1, 15.5, 56/33, 29

[56] References Cited

U.S. PATENT DOCUMENTS 3,760,574  9/1973  Tassone ................................. 56/330
4,207,727  6/1980  Poytress ................................ 56/330
4,291,526  9/1981  Hiyama et al. ....................... 56/330

FOREIGN PATENT DOCUMENTS 2417248 10/1979 France .................................. 56/330

Primary Examiner—Stephen J. Novosad
Attorney, Agent, or Firm—Head & Johnson

[57] ABSTRACT

A pivoting counterforce brush for use with an underslung grapevine comber for cleaning and positioning shoots of a grapevine overhanging the guide wires of a divided canopy is mounted on the frame of the comber in a position to provide a counterforce against a primary brush of the comber which grooms above the roof portion of the canopy as the comber moves along a path of travel parallel to the guide wires. A spindle is mounted on the comber frame at a level below the roof portion of the canopy. The axis of the spindle is substantially transverse to the path of travel of the comber. A bracket is journalled on the spindle. A rotating brush is mounted on the trailing side of the bracket with the axis about which the brush rotates extending rearwardly from the bracket. A brush driver is mounted on the leading side of the bracket and is coupled to the rotating brush to drive the brush about its axis. The rotating brush and the drive apparatus provide a moment about the axis of the spindle sufficient to urge the brush upwardly against the roof portion of the canopy. However, the brush remains free to rotate downwardly about the spindle in response to contact of the brush with the canopy cross members or other immovable objects. A stop member limits the upward rotation of the brush about the spindle axis to a preselected angle above the horizontal. Preferably, the bracket will permit the angle of the rotating brush in relation to the direction of travel to be varied depending on conditions to maximize the benefit of the brush. Similarly, the relationship of the stop member to the bracket may also be varied the stop member to the bracket may also be varied to adjust the positioning of the brush in relation to horizontal, again to maximize efficiency of the brush in the combing process. A vine guide extending in front of the leading portion of the drive apparatus directs the vines to the appropriate side of the brush. A deflector extending in front of the leading portion of the apparatus protects the apparatus from damage due to contact with immovable objects. The frame of the comber on which the deflector is mounted is spring hinged to allow the frame to swing away from immovable objects in response to the deflector making contact with such objects.

20 Claims, 4 Drawing Sheets

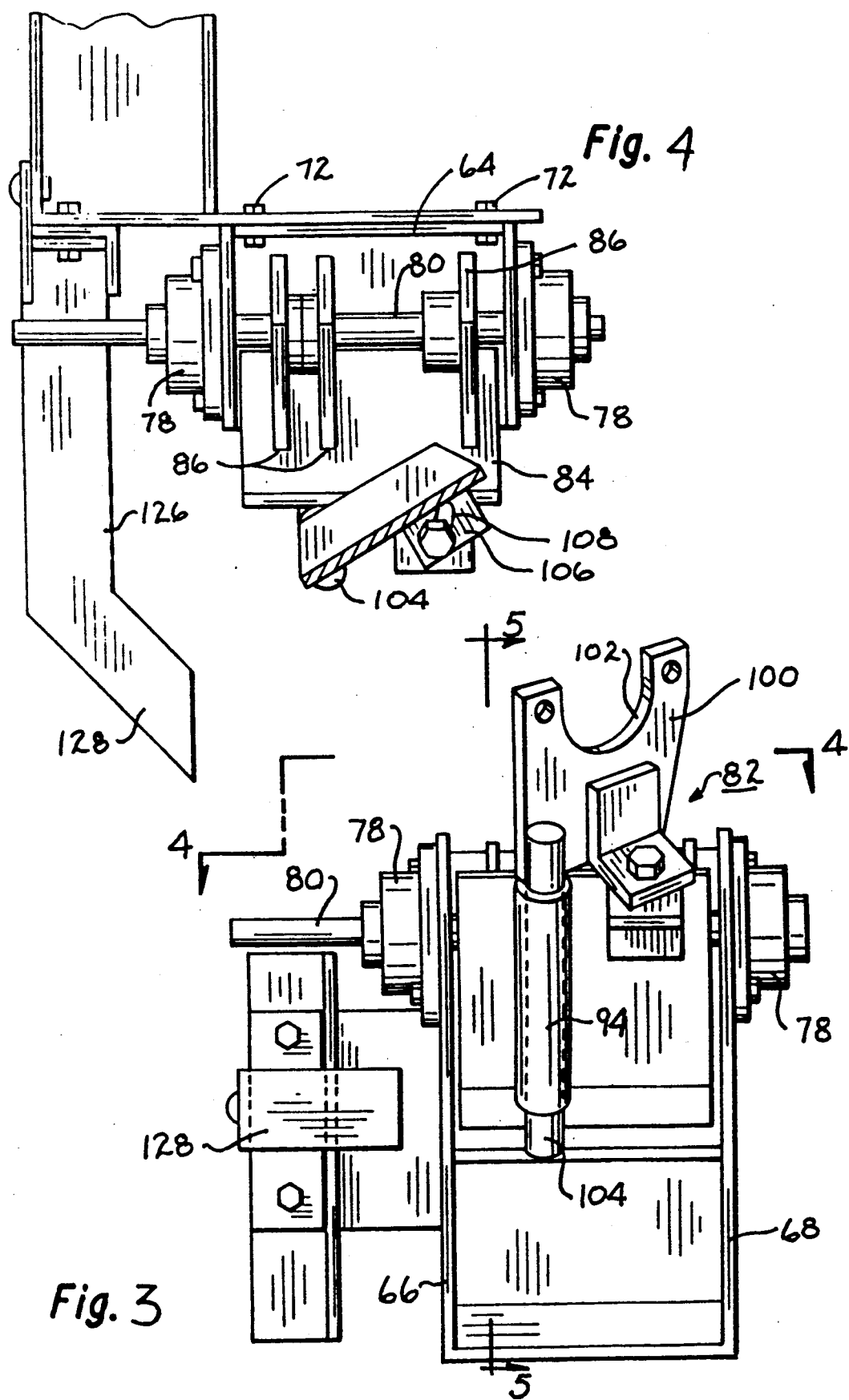

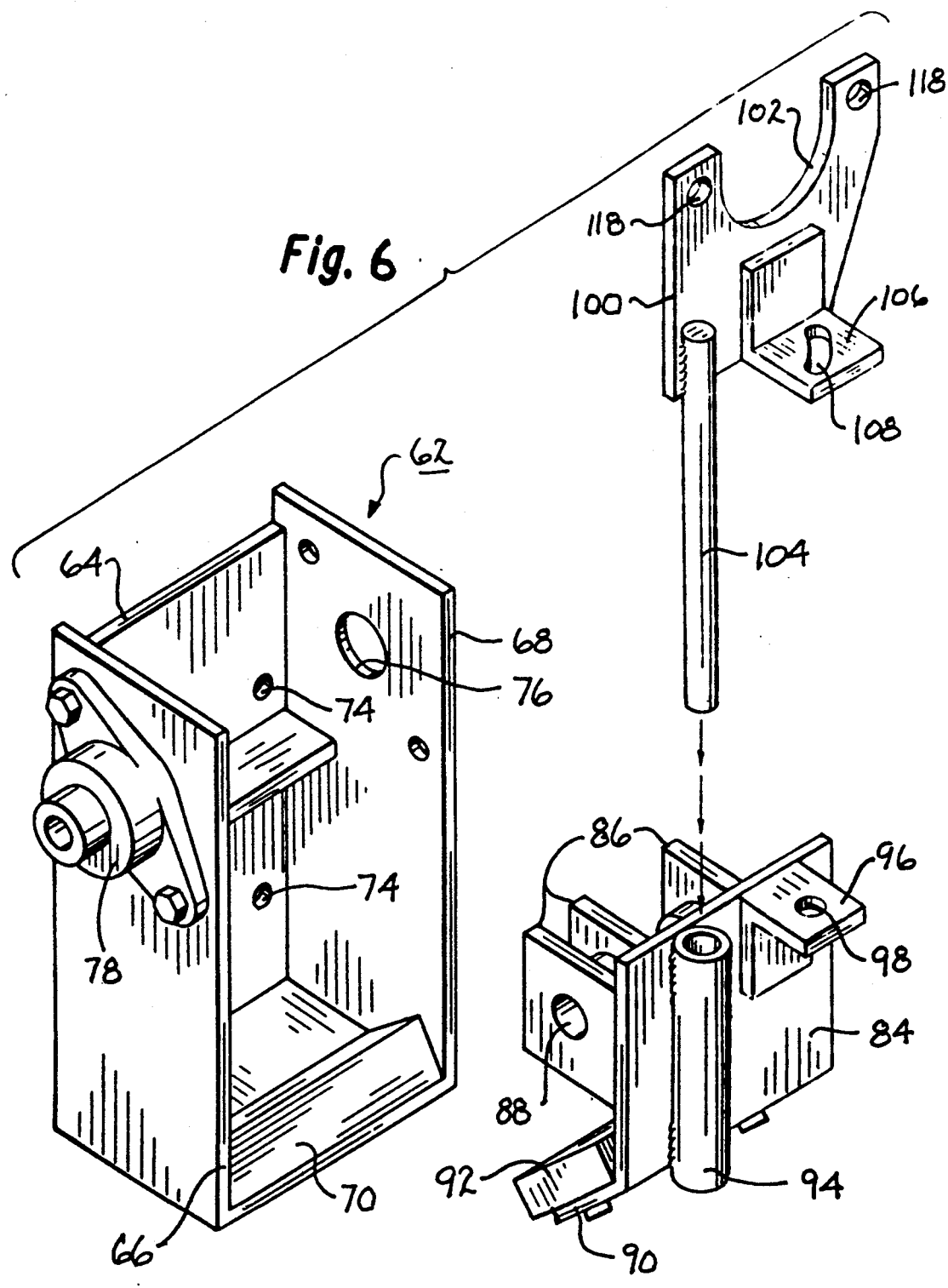

VINE COMBER PIVOTING COUNTERFORCE BRUSH

BACKGROUND OF THE INVENTION

This invention relates generally to grapevine grooming and more particularly concerns apparatus for combing grape vines trained to a divided canopy system.

Grape vines which have a drooping growth habit benefit from shoot positioning to render the vines more active photosynthetically and to allow penetration of light into the fruit zone and the lower buds. Increasing the light that penetrates into the vine canopy improves fruit quality in the initial year of shoot positioning and makes the basel buds that receive the increased light intensity more productive for the following year.

Manual shoot positioning is impractical due to the cost and the difficulty in obtaining adequate hand labor to accomplish the task in a timely manner. Today, grapes with a drooping growth habit are usually trained either on a bilateral cordon or on a divided canopy trellis system. On a bilateral cordon system, the vines are trained to a single wire trellis. On a divided canopy system, or Geneva Double Curtain System, the vines are trained on two parallel wires mounted on cross arms attached to posts.

The divided canopy system will manage a vineyard that has more growth and production capacity than a bilateral cordon system because a single row of vines is trained into two rows. However, unless vines trained to a divided canopy system are shoot positioned, the growth and production advantages are lost due to the excess shading of the fruit, leaves and canes. An added benefit to shoot positioning is the facilitation of mechanical pruning which is only possible if a majority of the basel buds have adequate sunlight exposure, making hand selection unnecessary during the pruning process.

A machine with an overhanging arm with counter-rotating brushes disposed on opposites sides of the vines currently exists to shoot position vines trained to the single wire trellis of a bilateral cordon system. However, no satisfactory combing machine exists for use with the divided canopy system, which is the more productive and more desirable system for producing higher quality fruit. It has long been recognized that a machine with an underslung arm with counter rotating brushes could provide the necessary restraint to shoot position canes in a divided canopy system. However, no such machine has yet been developed that will work effectively because none will provide the necessary counter-rotating force on the horizontal portion of the vines extending from the posts to the cross arms and still allow the machine to move past the cross arms and crooked vine trunks of the divided canopy.

It is, therefore, an object of the present invention to provide a device for use with an underslung grape vine comber that will provide an upward counter-rotating force on the horizontal portion of vines extending horizontally in a divided canopy. It is a further object of this invention to provide such a brush that will pivot to clear the cross arms and crooked vine trunks of the divided canopy, as well as other immovable objects in its path, in response to contact of the brush with the cross arms, vine trunks or other immovable objects. Another object of the present invention is to provide such a counterforce brush apparatus as will permit variation of the angular disposition of the brush to accommodate various conditions of vine length, strength, entanglement and cleaning requirements. A further object of the present invention is to provide a counterforce brush usable on an underslung vine comber which may be mounted on a tractor, harvester or other suitable self-propelled farming equipment. And it is an object of the present invention to provide a counterforce brush usable with a variety of drive means, such as pneumatic, electrical or hydraulic, as may be convenient depending on the selected propelling apparatus as well as other limiting conditions.

SUMMARY OF THE INVENTION

In accordance with the invention a pivoting counterforce brush is provided for use with an underslung grapevine comber for cleaning and positioning shoots of a grapevine overhanging the guide wires of a divided canopy. The pivoting counterforce brush is mounted on the frame of the comber in a position to provide a counterforce against a primary brush of the comber which grooms above the roof portion of the canopy as the comber moves along a path of travel parallel to the guide wires. A spindle is mounted on the comber frame at a level below the roof portion of the canopy. The axis of the spindle is substantially transverse to the path of travel of the comber. A bracket is journalled on the spindle. A rotating brush is mounted on the trailing side of the bracket with the axis about which the brush rotates extending rearwardly from the bracket. A brush driver is mounted on the leading side of the bracket and is coupled to the rotating brush to drive the brush about its axis. The rotating brush and the drive apparatus provide a moment about the axis of the spindle sufficient to urge the brush upwardly against the roof portion of the canopy. However, the brush remains free to rotate downwardly about the spindle in response to contact of the brush with the canopy cross members or other immovable objects. A stop member limits the upward rotation of the brush about the spindle axis to a preselected angle above the horizontal. Preferably, the bracket will permit the angle of the rotating brush in relation to the direction of travel to be varied depending on conditions to maximize the benefit of the brush. Similarly, the relationship of the stop member to the bracket may also be varied to adjust the positioning of the brush in relation to horizontal, again to maximize efficiency of the brush in the combing process. A vine guide extending in front of the leading portion of the drive apparatus directs the vines to the appropriate side of the brush. A deflector extending in front of the leading portion of the apparatus protects the apparatus from damage due to contact with immovable objects. The frame of the comber on which the deflector is mounted is spring hinged to allow the frame to swing away from immovable objects in response to the deflector making contact with such objects.

BRIEF DESCRIPTION OF THE DRAWINGS

Other objects and advantages of the invention will become apparent upon reading the following detailed description and upon reference to the drawings in which:

FIG. 3 is a front elevational view taken along the line 3—3 of FIG. 2;

FIG. 4 is a top plan view taken along line 4—4 of FIG. 3;

FIG. 6 is a perspective developmental view of the preferred embodiment of part of the line comber pivoting counterforce brush of FIG. 1 in a disassembled condition.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
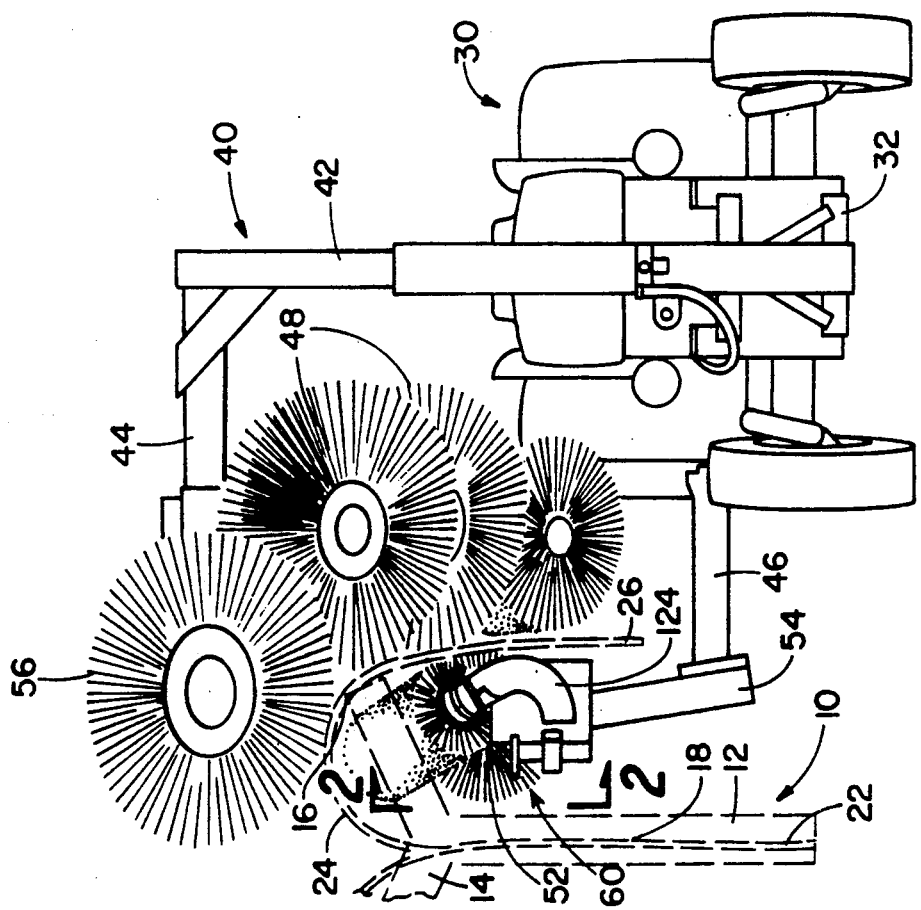
FIG. 1 is a front elevational view of an underslung vine comber mounted on a tractor with a preferred embodiment of the vine comber pivoting counterforce brush mounted on the comber showing the positioning of the comber and the counterforce brush in relation to a divided canopy trellis system.

Turning first to FIG. 1, a grapevine combing unit for use with a divided canopy vine system is illustrated. The divided canopy system 10 includes a series of upright members 12 with cross members 14 mounted atop the upright members 12 in a T or Y configuration. Extending across the extremities of the cross members 14 are a pair of wires 16 which run parallel to each other along similar cross members of a row of posts 12 in the canopy system 10. A central parallel wire 18 extends at approximately the midpoint of the posts 12. The vine trunks 22 extend vertically past the central wire 18 to roof portions 24 which extend out to one of the parallel wires 16. The vine grows along the wire 16 and the vine canes 26 extend downwardly from the vine. As shown, the vine comber is mounted on a tractor 30 and the device is connected to the frame 32 of the tractor 30 at the front of and approximately at the midpoint of the tractor 30.

The combing machine 40 consists of an upright support frame 42 fixed to the tractor frame 32 with a horizontal member 44 extending from the top of the upright frame laterally of the tractor 30 toward the divided canopy system 10. A U-shaped underslung frame 46 is mounted on the lateral extension of the horizontal member 44 so that the vine canes 26 can hang within the U-shaped frame 46. A plurality of brushes 48 on the tractor side upright 50 of the frame 46 operates against a plurality of brushes 52 mounted on the vine side upright 54 of the frame 46 to comb the vertical canes 26 hanging downwardly from the wire 16. A primary brush 56 mounted at the extension of the horizontal member 44 grooms the roof portion 24 of the vines. However, the primary brush 56 cannot effectively accomplish its purpose without a counterforce being exerted from the underside of the roof portion 24 of the vine, as in the case of the brushes 52 with respect to the brushes 48 grooming the canes 26. This is accomplished by the pivoting counterforce brush assembly 60 which is the subject matter of the present invention.

Before proceeding with the description of the pivoting counterforce brush assembly 60, it should be pointed out that the position of the combing machine 40 relative to the divided canopy system 10 is adjustable. That is, the upright support frame 42 of the combing machine 40 is a telescoping member, perhaps hydraulically operated, to permit selected variation of the elevation of the horizontal member 44 and therefore of the U-shaped underslung frame 46. Similarly, the horizontal member 44 is also a telescoping member, perhaps hydraulically operated, to permit variation of the lateral extension of the U-shaped underslung frame 46 from the tractor 30. Thus, the combing machine 40 can be positioned in relation to the divided canopy system 10 to properly position the rooftop portion 44 and canes 26 within the combing machine 40. Furthermore, while the combing machine 40 is illustrated mounted on a tractor 30, the machine 40 can be mounted on any suitable self-propelled device or equipment available at the site. For example, one preferred arrangement would be to mount a pair of combing machines 40 in opposite hand relationship on a harvester that would ride over the divided canopy system 10 so that the canes 26 on either side of the canopy 10 could be simultaneously groomed.

A preferred embodiment of the pivoting counterforce brush assembly 60 is illustrated in greater detail in FIGS. 2 through 6. The assembly 60 is mounted on a forward portion 58 of the vine side upright 54 of the U-shaped underslung frame 46. A housing 62 consisting of a back plate 64 and side plates 66 and 68 is reinforced by an angle iron 70 connected between the lower leading portions of the side plates 66 and 68. The housing 62 is connected to flanges on the forward portion 58 of the tractor side upright 50 by bolts 72 through holes 74 in the back plate 64. The side plates 66 and 68 have apertures 76 axially aligned across the housing 62. Bearings 78 are mounted on the exterior of the side plates 66 and 68 aligned with the apertures 76 to receive a spindle 80. The housing 62 is mounted on the underslung frame 46 so that the axis of the spindle 80 is substantially horizontal and transverse to the direction of movement of the tractor 30 and the combing machine 40.

Figure 5:
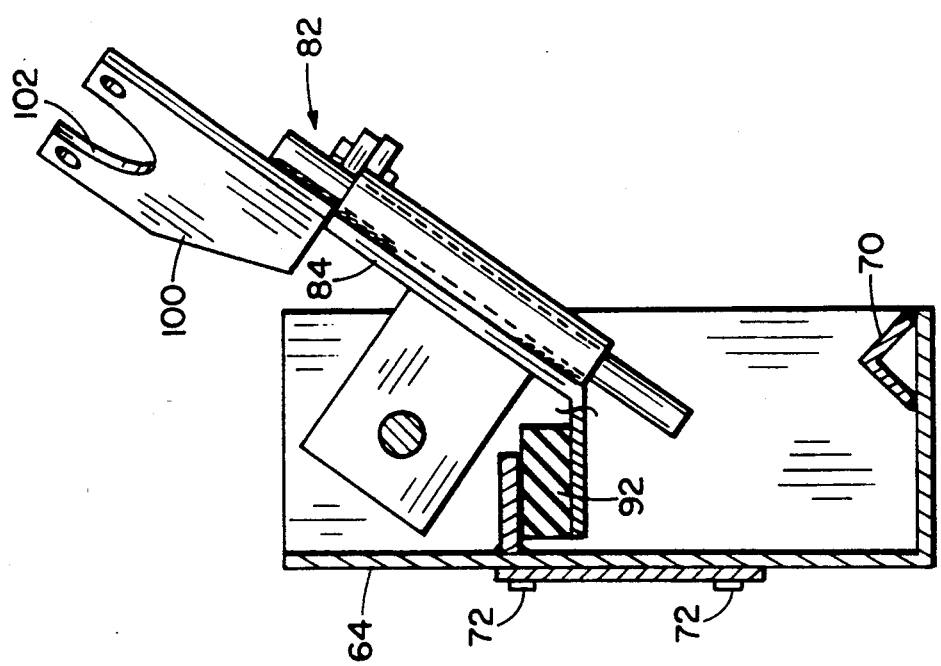
FIG. 5 is a cross-sectional view taken along the line 5—5 of FIG. 3.

A bracket assembly 82, best seen in FIGS. 5 and 6, is journalled for rotation on the spindle 80. The bracket assembly 82 includes a plate 84 with a plurality of ears 86 welded to one side of the plate 84. Apertures 88 through the ears 86 are aligned to be journalled on the spindle 80. Welded to the bottom edge of the plate 84 is a second plate 90 which extends at an angle from the first plate 84 toward the back plate 64 of the housing 62. A rubber block 92 is bolted to the inside face of the second plate 90 and extends inwardly toward the back plate 64 of the housing 62 beyond the leading edge of the second plate 90 so that, as the plate 84 rotates about the spindle 80, the leading edge of the rubber block 92 will contact the inside face of the back plate 64 to limit the rotation of the plate 84. In addition, the rubber block 92 operates to absorb the shock of impact with the back plate 64. A sleeve 94 is mounted on the exterior surface of the plate 84 in transverse relationship to the axis of the spindle 80. Also mounted on the exterior surface of the plate 84 is an angle bracket 96 having a horizontal face perpendicular to the plate 84 aligned with the top edge of the plate 84 and having an aperture 98 therethrough. The bracket 82 further includes a yoke member 100 with a topwardly accessible seat 102. The yoke member 100 has a downwardly extending rod 104 and an angle bracket 106 mounted on one surface thereof so that, when the rod 104 is inserted in the sleeve 94, the horizontal leg of the yoke angle bracket 106 may be aligned with the horizontal leg of the plate angle bracket 96. The yoke angle bracket 106 has an arced aperture 106 with a radius centered on the rod 104 at a distance corresponding to the radius from the sleeve 94 to the aperture 98 in the plate 96. Thus, the yoke member 100 can be rotated in relation to the plate 84 and locked in any desired relationship along the arched aperture 108 by a bolt extending through the arched aperture and the aperture 98 in the plate angle bracket 96. Preferably, the arched aperture 108 will permit rotation in a range of up to 110°, so that the plane of the yoke member 100 may be fixed in any position ranging from aligned with the axis of the spindle 80 to 10° beyond a plane transverse to the axis of the spindle 80. Most frequently, the yoke member 100 will be set at an angle of approximately 20° to 40° from the axis of the spindle 80. Thus it can be seen that, by selection of the length of the rubber block 92, the angular position of the yoke member 100 in relation to horizontal can be determined and, by rotation of the yoke member 100 about the axis of the rod 104 within the sleeve 94, the angular position of the yoke member 100 in relation to the path of travel of the vine comber 40 may be determined.

Figure 2:
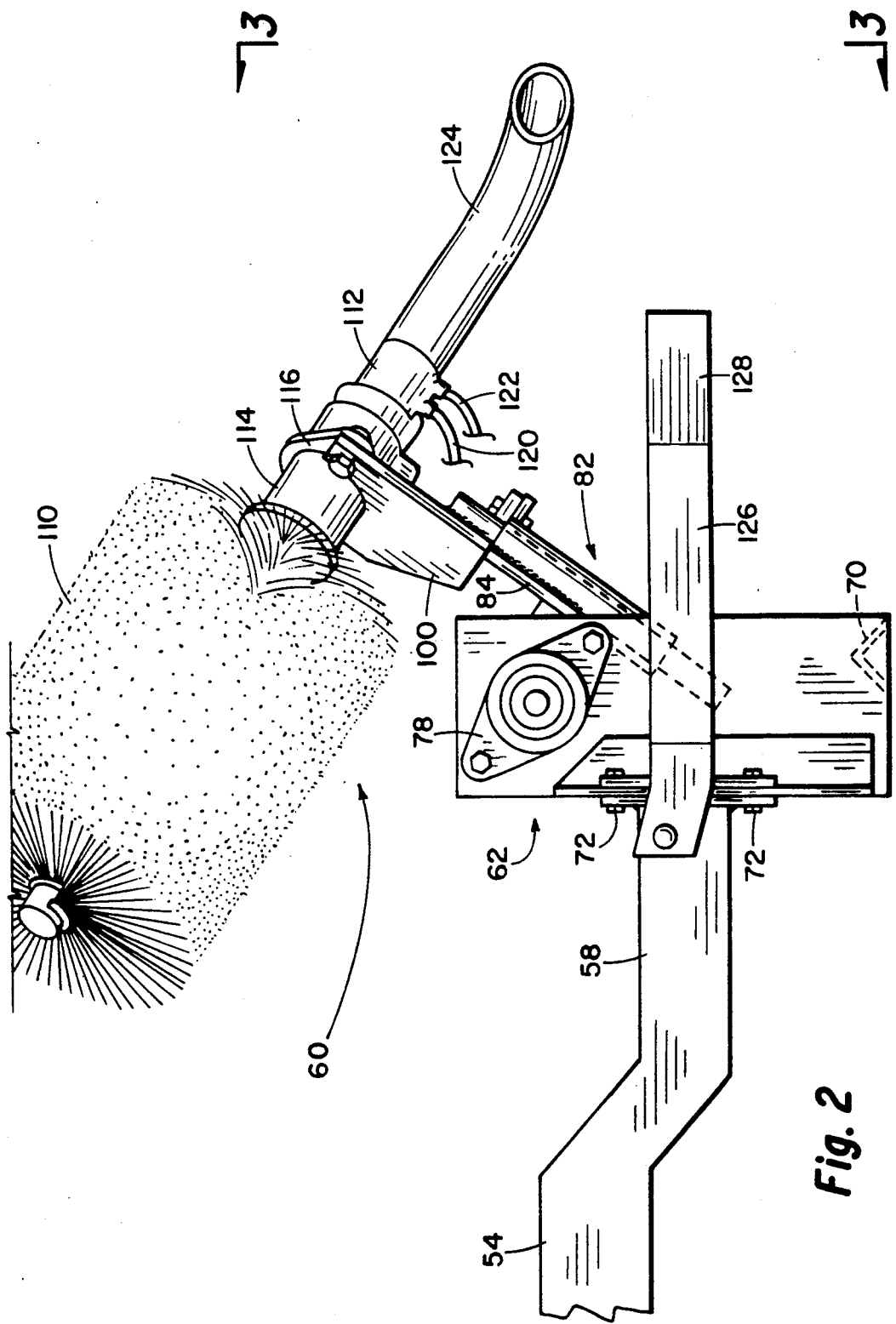
FIG. 2 is a side elevation of the preferred embodiment of the vine comber pivoting counterforce brush taken along the line 2—2 of FIG. 1.

Looking at FIG. 2, the mounting of the counterforce brush 110 on the bracket assembly 82 can be seen. The brush 110 is mounted for rotation on the trailing side of the bracket assembly 82 while the drive 112 for the brush 110 is mounted on the leading side of the bracket assembly 82. As shown, the brush 110 and drive 112 are connected to the yoke member 100 of the bracket assembly 82 by a coupler 114 with flanges 116 bolted to the yoke member 100 through holes 118 in the yoke member 100. As shown, the drive 112 is hydraulic and is connected to the hydraulic pump and reservoir on the tractor (not shown) by input and output hydraulic lines 120 and 122. However, depending upon the power source available, the drive 112 might be electrical or pneumatic as well.

Also extending forwardly of the drive 112 is a guide member 124 which, in the preferred embodiment shown, resembles an L-shaped section of automobile exhaust pipe. As can best be seen in FIG. 1, the guide member 124 curves from the drive 112 toward the upright posts 12 of the canopy system 10.

Also mounted on the forward portion 58 of the vine side upright 54 of the underslung frame 46 is a deflector 126 which, as is best seen in FIG. 4, extends in the leading direction beyond the bracket assembly 82 and has a forward portion 128 that angles toward the tractor 30. Preferably, the vine side upright 54 of the underslung frame 46 will be connected to the frame 46 by a spring tension hinge arrangement (not shown) for cooperation with the deflector 126 in a manner to be hereinafter explained.

In operation, with the counterforce brush assembly 60 mounted on the combing machine 40, the rubber block 92 is selected to provide the desired maximum amount of rotation of the bracket assembly 82 in a leading direction about the spindle 80. The yoke member 100 is then rotated into its desired angular position within the sleeve 94 and bolted in place through the arched aperture 108 in the yoke angle bracket 106 and the circular aperture 98 in the plate angle bracket 96. The appropriate length of the rubber block 92 and positioning of the angle brackets 96 and 106 is determined by the conditions of the vines to be groomed, all of which are to the judgment of the individual user. With the vertical and horizontal extension of the underslung frame 46 being established to permit the canes 26 to extend downwardly into the underslung frame 46, it is preferred that the angular relationship of the brush 110 as determined by the length of the rubber block 92 allows the top of the brush 110 to extend to a point approximately 3 inches higher than the vine supporting wires 16. This is best illustrated in FIG. 1. As the tractor 30 and the combing machine 40 proceed along the path defined by the canes 26, the guide member 124 directs the canes 26 into position within the U-shaped underslung frame 46. The weight of the brush 110, drive 112 and guide 124 are coordinated to the configuration of the bracket assemblies 82 such that a sufficient resultant moment about the axis of the spindle 80 urges the rotating brush 110 into firm position against the underside of the roof portion 24 of the canopy system 10. As the brush 110 comes into contact with the cross members 116 of the canopy system 10, the immovable cross members 16 overcome the moment urging the brush 110 forwardly and upwardly and deflects the brush 110 rearwardly and downwardly, causing the brush to rotate to a horizontal position to clear the cross members 14 as the combing machine 40 progresses along its path. This pivoting motion of the brush assembly 60 also permits the assembly 60 to clear immovable objects other than the cross members 14.

If the brush assembly 60 should be moving along a path interfered with by crooked vine trunks 22, or even become aligned with the upright posts 12 or with some other immovable objects in its path, the angle portion 128 of the deflector 126 will make contact with the obstacle in advance of brush assembly 60, causing the spring biased hinge arrangement to flex and shift the brush assembly 60 toward the tractor 30 and away from the immovable obstacle, thereby protecting the brush assembly 60 from damage.

The brush assembly 60 is preferably constructed of steel and is extremely durable, although other materials may be used in its construction.

Thus, it is apparent that there has been provided, in accordance with the invention, a vine comber pivoting counterforce brush that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use with an underslung grapevine comber for cleaning and positioning shoots of a grapevine overhanging a pair of wires extending in parallel along the ends of crossmembers fixed to vertical posts to form a divided canopy, apparatus mounted on a frame of the comber for providing a counterforce against a primary brush of the comber grooming above the roof portion of the canopy as the comber moves along a path of travel parallel to the wires comprising:

a spindle mounted on said comber frame at a level below said roof portion of said canopy with a spindle axis substantially transverse to said path of travel;

a bracket journaled on said spindle having leading and trailing sides in relation to said path of travel;

means mounted on said trailing side of said bracket for rotating about a brushing axis extending rearwardly from said bracket;

means mounted on said leading side of said bracket and coupled to said rotating means for driving said rotating means about said brushing axis, said rotating means and said driving means providing a resultant moment about said spindle axis to urge said rotating means upwardly against said roof portion of said canopy and to permit movement of said rotating means downwardly in response to contact with said crossmembers; and means for limiting upward rotation of said rotating means to a preselected angle above horizontal.

2. Apparatus according to claim 1 further comprising means for guiding said shoots into overhanging relationship relative to said rotating means.

3. Apparatus according to claim 2, said guiding means comprising a section of tubing extending forward of said driving means and curving toward said vertical posts of said canopy.

4. Apparatus according to claim 1, said brushing axis being approximately transverse to said spindle axis.

5. Apparatus according to claim 1 further comprising means for varying the angle of said brushing axis in relationship to said spindle axis.

6. Apparatus according to claim 5, said varying means permitting selection of said angle over a range of from approximately transverse thereto on one side of said spindle axis to approximately 10 degrees beyond the other side of said spindle axis.

7. Apparatus according to claim 5, said varying means permitting selection of said angle over a range of from approximately 20 to approximately 40 degrees from said spindle axis toward said canopy posts.

8. Apparatus according to claim 1, said rotating means having a brush mounted thereon for rotation about said brushing axis.

9. Apparatus according to claim 8, said brush being substantially cylindrical.

10. Apparatus according to claim 1, said driving means being hydraulic.

11. Apparatus according to claim 1, said driving means being electric.

12. Apparatus according to claim 1, said driving means being pneumatic.

13. Apparatus according to claim 1, said limiting means being adjustable to vary said preselected angle.

14. Apparatus according to claim 1, said limiting means comprising a stop member mounted on said bracket for rotation into abutment with said comber frame when said rotating means is at said preselected angle above horizontal.

15. Apparatus according to claim 14, said stop member having a block of flexibly resilient material for abutment with said comber.

16. Apparatus according to claim 15, said block being removably exchangable to vary its length and therefore said preselected angle.

17. Apparatus according to claim 1, said spindle being mounted on a spring biased, hinged portion of said frame and said apparatus further comprising means mounted on said hinged portion and extending forwardly of said driving means for deflecting said hinged portion in response to impact of said deflecting means with immovable obstacles.

18. For use with an underslung grapevine comber for cleaning and positioning shoots of a grapevine overhanging a pair of wires extending in parallel along the ends of crossmembers fixed to vertical posts to form a divided canopy, apparatus mounted on a frame of the comber for providing a counterforce against a primary brush of the comber grooming above the roof portion of the canopy as the comber moves along a path of travel parallel to the wires comprising:

a housing mounted on said comber frame;

a spindle mounted on said housing at a level below said roof portion of said canopy with a spindle axis substantially transverse to said path of travel;

a first bracket member journaled on said spindle for rotation about said spindle axis;

a second bracket member mounted on said first bracket member for rotation about a vertical axis in relation thereto, said second bracket member having leading and trailing sides in relation to said path of travel;

means mounted on said trailing side of said second bracket member for rotating about a brushing axis extending rearwardly from said second bracket member;

means mounted on said leading side of said second bracket member and coupled to said rotating means for driving said rotating means about said brushing axis, said rotating means, said driving means and said first and second bracket means providing a resultant moment about said spindle axis to urge said rotating means upwardly against said roof portion of said canopy and to permit movement of said rotating means downwardly in response to contact with said crossmembers; and flexibly resilient means mounted on said first bracket member for rotation into abutment with said housing for limiting rotation of said first bracket means about said spindle axis such that said brushing axis cannot rotate beyond a predetermined angle at or less than vertical and for absorbing the shock of impact between said flexibly resilient means and said housing.

19. Apparatus according to claim 18 further comprising means for varying the angle of said brushing axis in relationship to said spindle axis, said varying means permitting selection of said angle over a range of from approximately transverse thereto on one side of said spindle axis to approximately 10 degrees beyond the other side of said spindle axis.

20. Apparatus according to claim 18, said housing being mounted on a spring biased, hinged portion of said frame and said apparatus further comprising means mounted on said hinged portion and extending forwardly of said driving means for deflecting said hinged portion in response to impact of said deflecting means with immovable obstacles.

* * * * *